Feb. 18, 1930.  E. G. K. ANDERSON  1,747,411
COMBINED CORD REEL AND CONDUCTOR DISTRIBUTOR
Filed Oct. 25, 1924  7 Sheets-Sheet 1
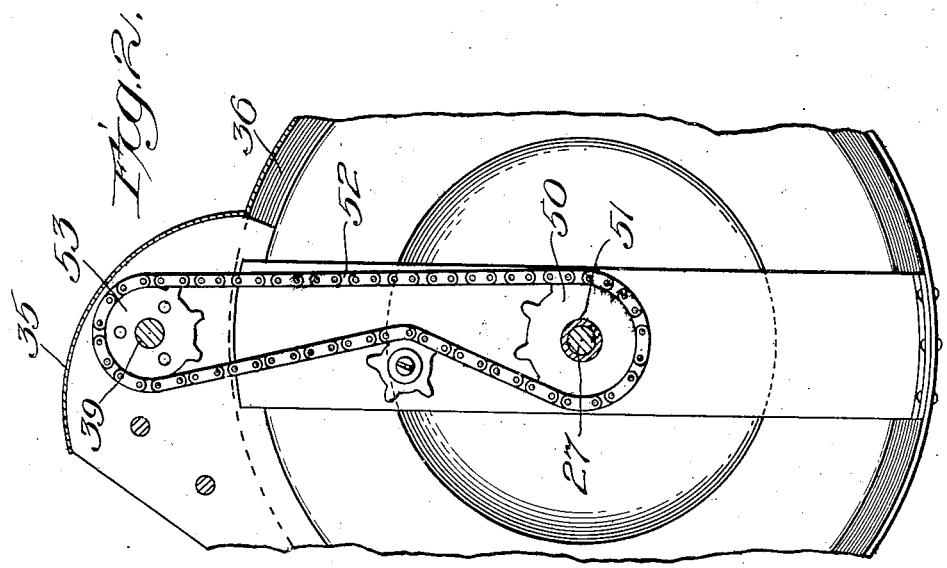
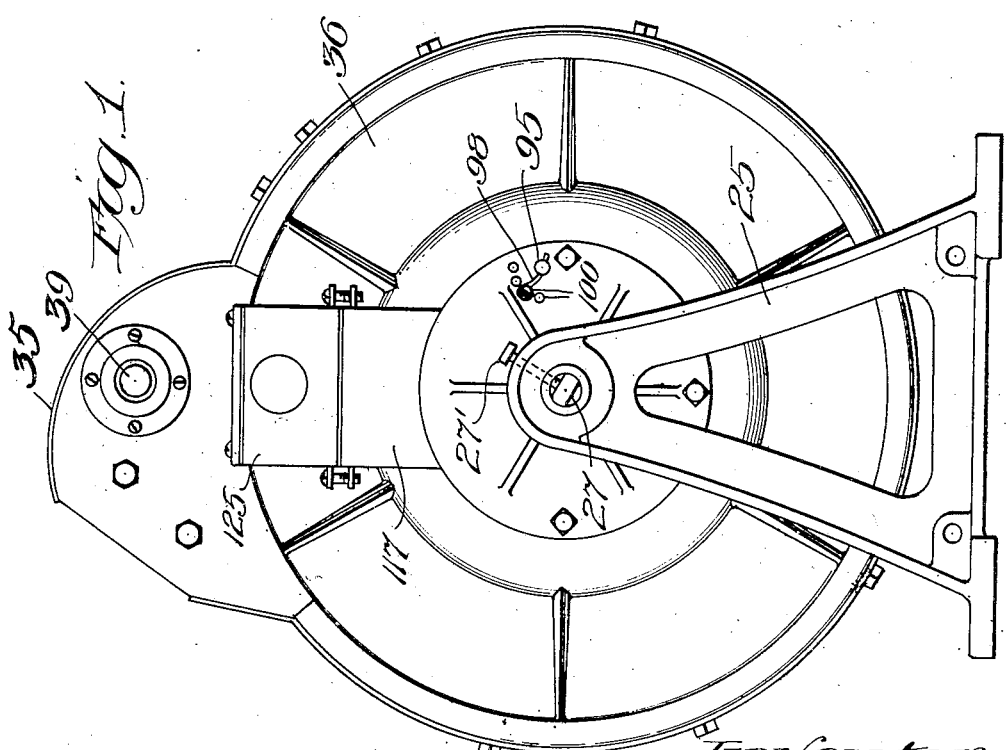
Inventor
Ernst G. K. Anderson
by William H. Hale
Atty

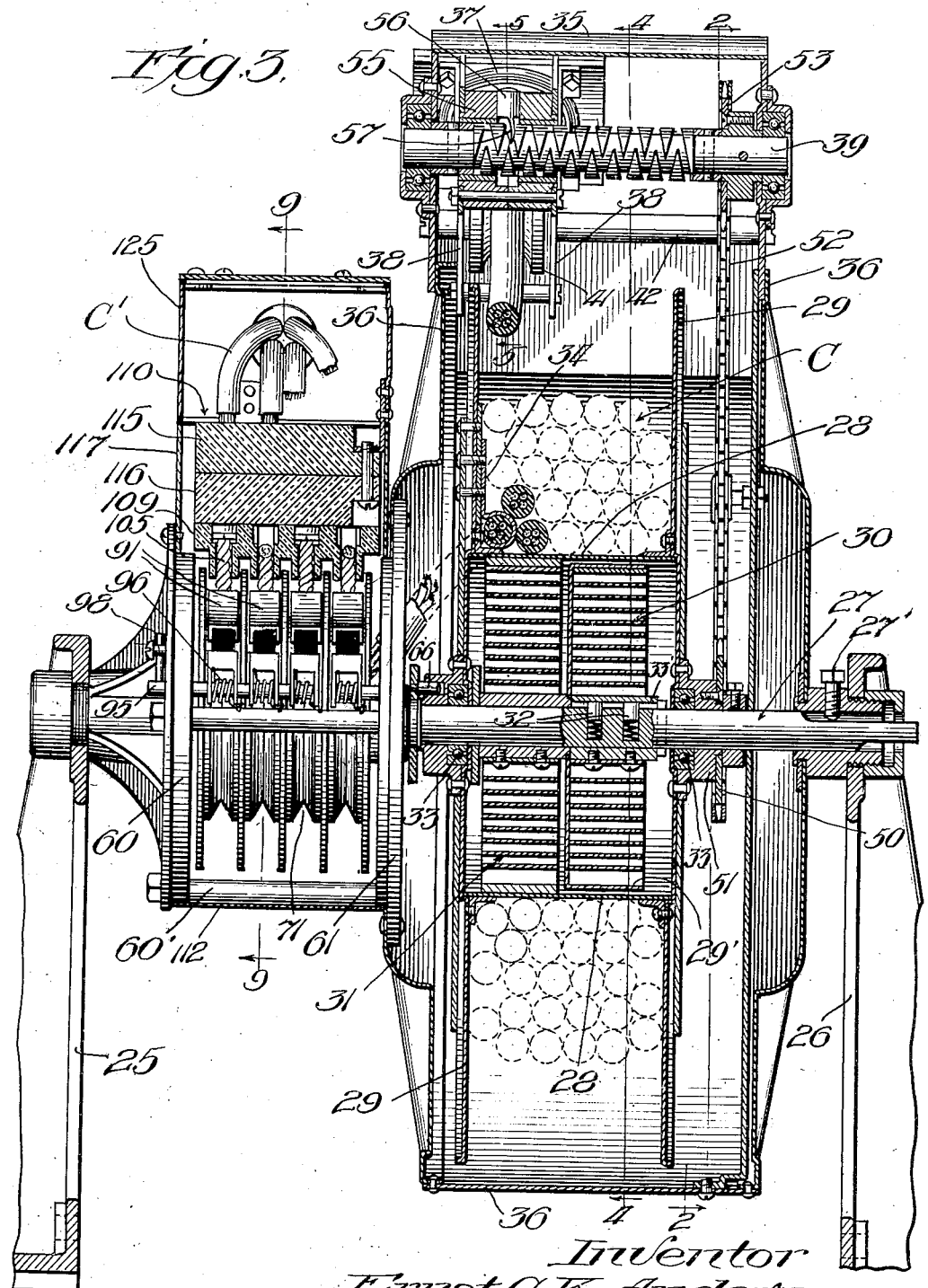

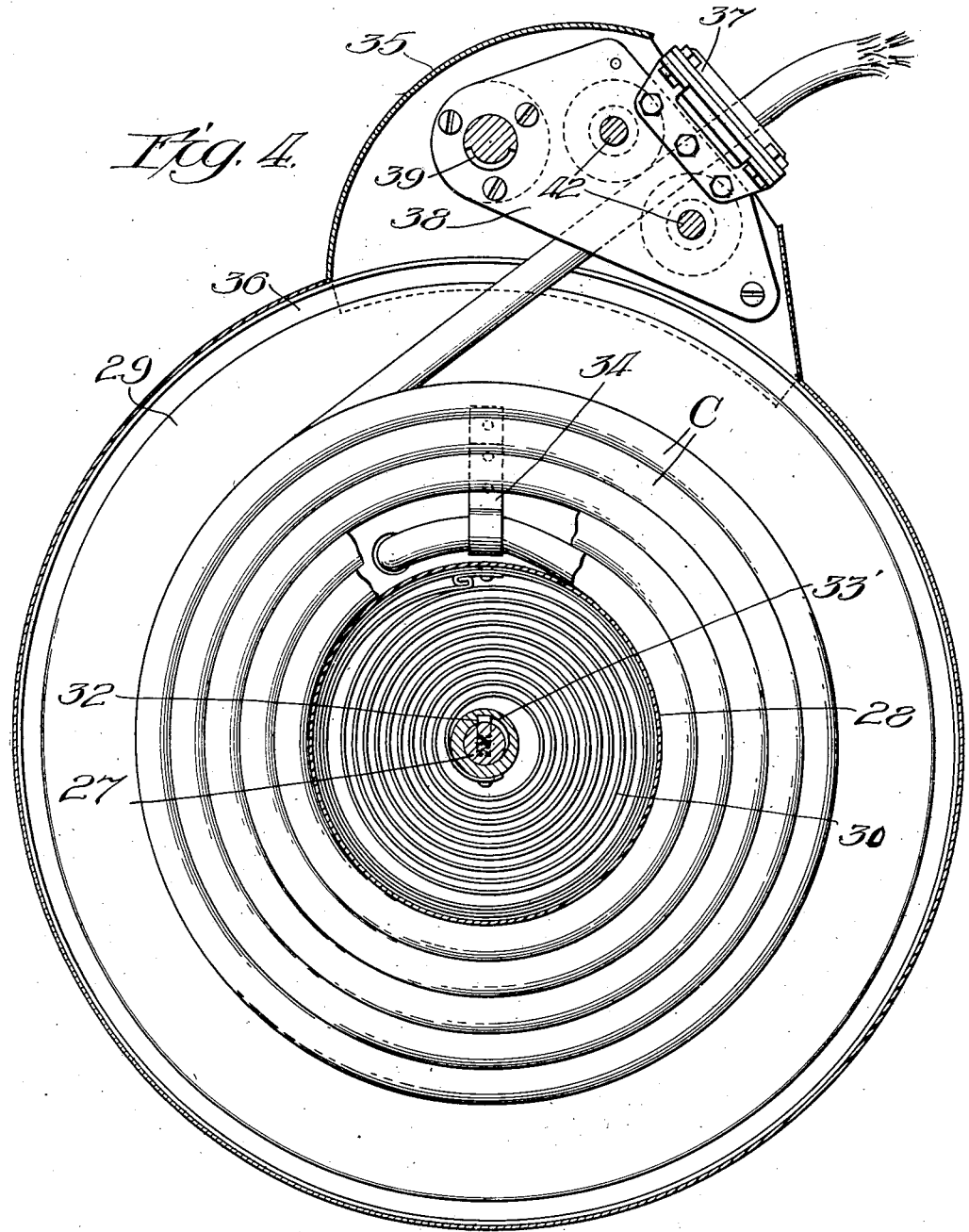

Feb. 18, 1930.					E. G. K. ANDERSON					1,747,411
COMBINED CORD REEL AND CONDUCTOR DISTRIBUTOR
Filed Oct. 25, 1924				7 Sheets-Sheet 4
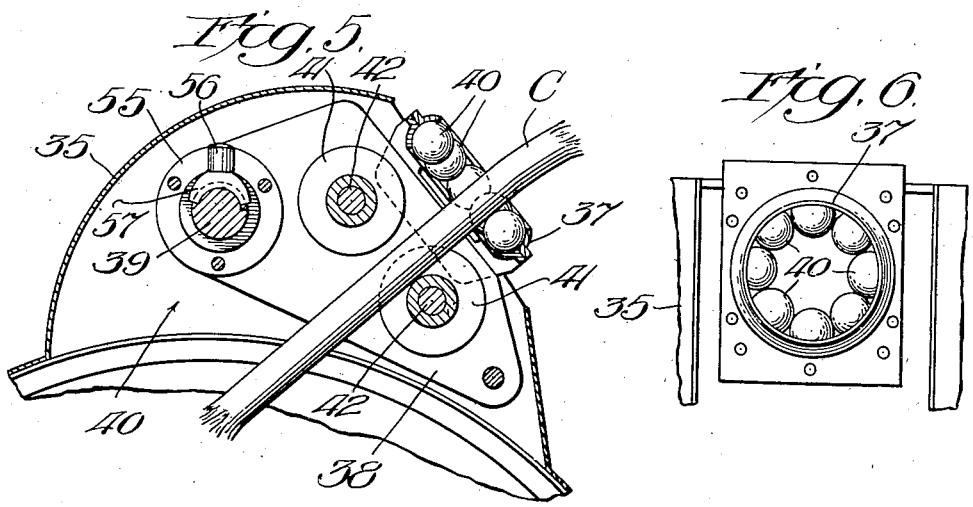
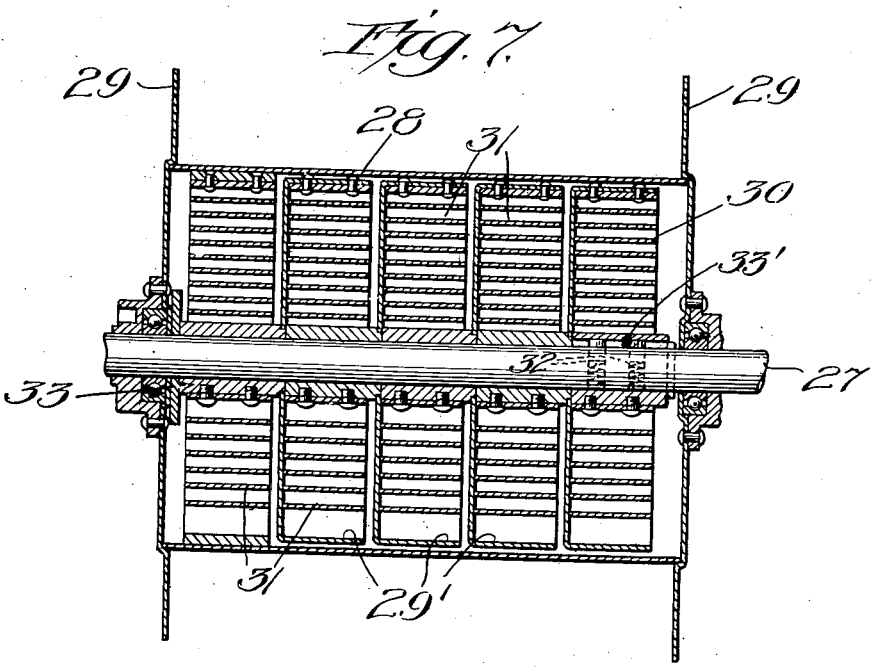
Inventor
Ernst G. K. Anderson
by William W. Hale
Atty Feb. 18, 1930. E. G. K. ANDERSON 1,747,411
COMBINED CORD REEL AND CONDUCTOR DISTRIBUTOR
Filed Oct. 25, 1924 7 Sheets-Sheet 5
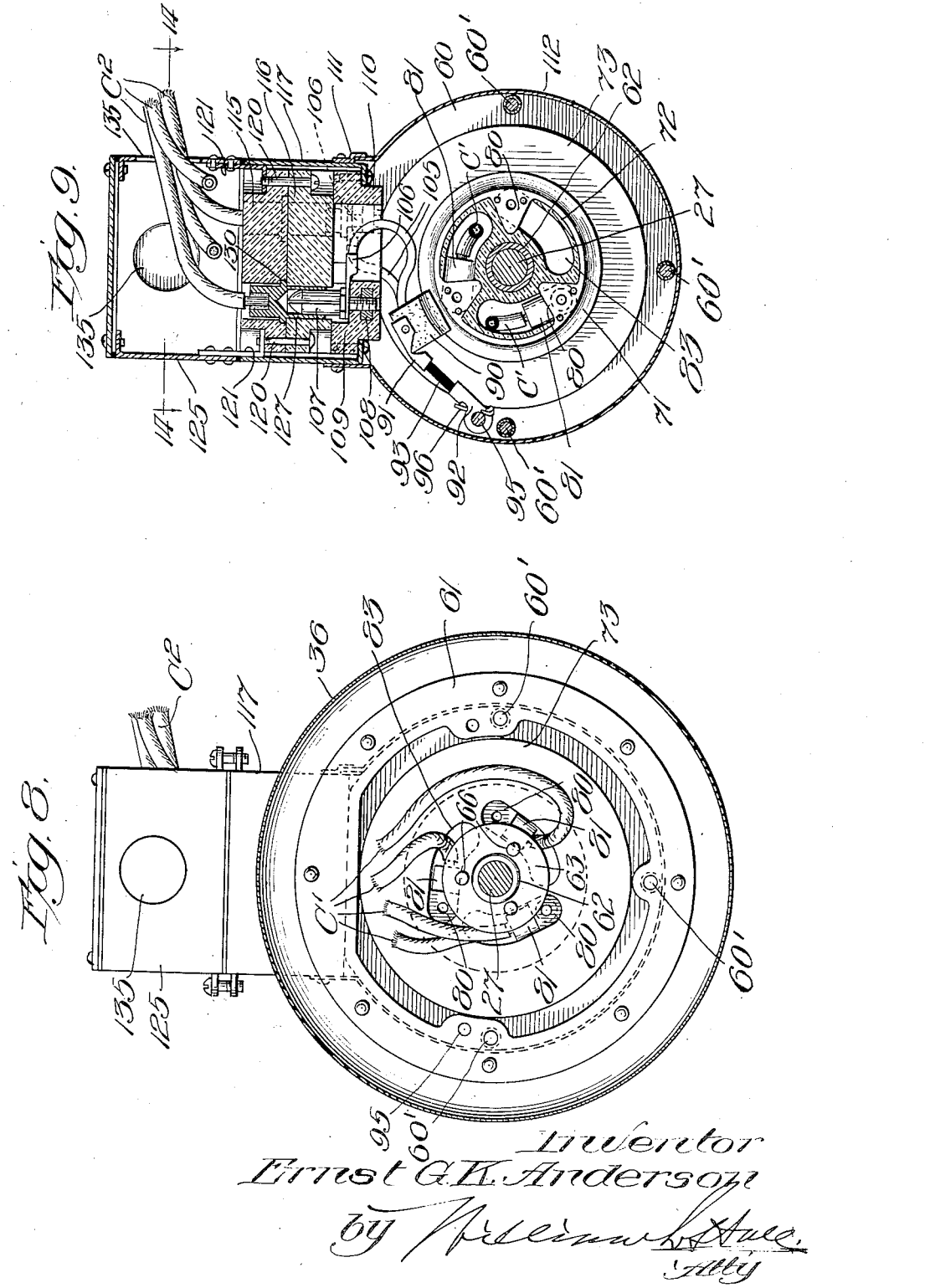
Inventor
Ernst G. K. Anderson
by William L. Hue
Atty

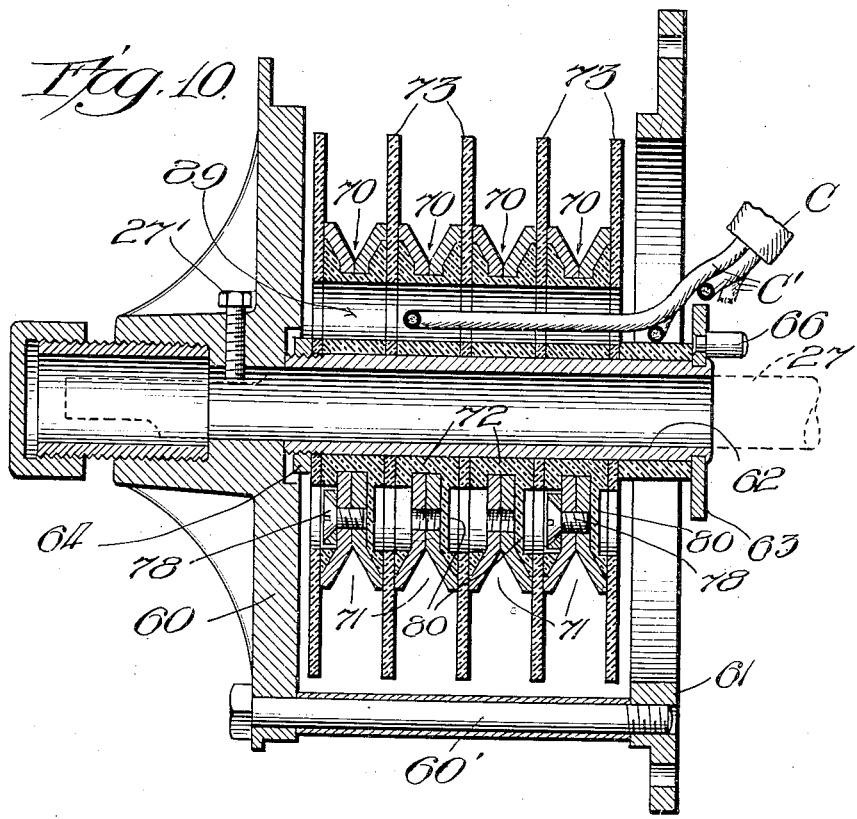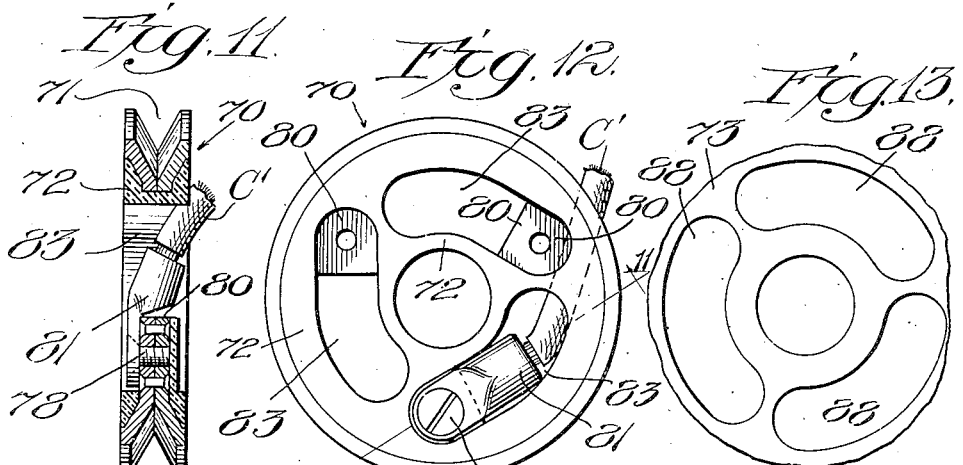

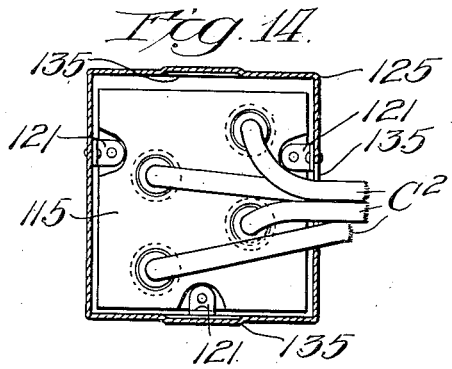
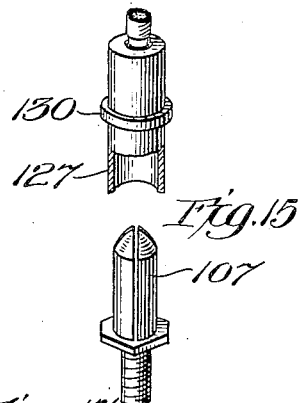
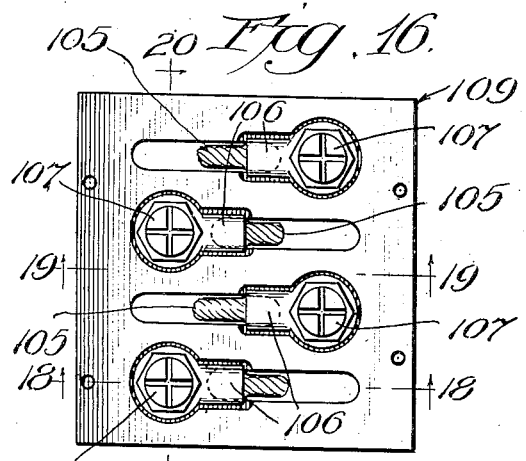
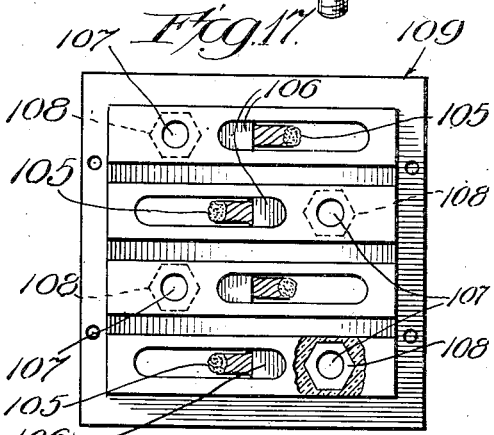
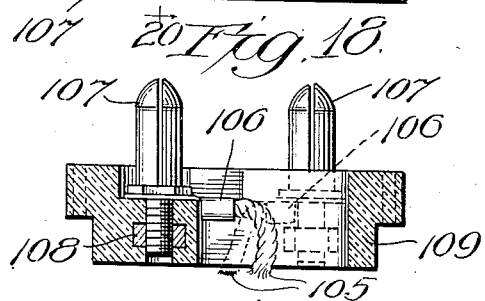
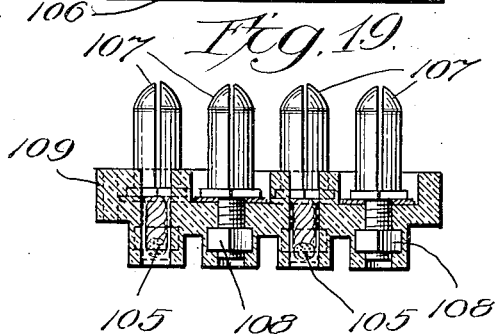
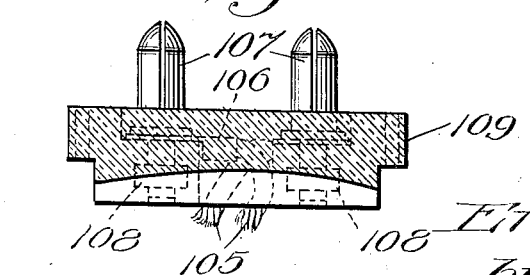

Patented Feb. 18, 1930

1,747,411

UNITED STATES PATENT OFFICE

ERNST G. K. ANDERSON, OF EVANSTON, ILLINOIS, ASSIGNOR TO APPLETON ELECTRIC COMPANY, A CORPORATION OF ILLINOIS

COMBINED CORD REEL AND CONDUCTOR DISTRIBUTOR

Application filed October 25, 1924. Serial No. 745,790.

This invention relates to improvements in an electric reel device and its appurtenances, designed with a reel to support a cable containing a number of conductors for connection to different electric motors or machines and onto which and from which the cable may be wound and unwound, respectively, and equipped with conductor and current distributing means to connect the several conductors to separate machines.

In the following description of my invention, the group of conductors, spirally wound in a familiar way, will be termed a cord, and the individual wires will be termed conductors, whether they be simple or compound conductors.

An application of the machine herein shown is to carry reel and conductor distributing mechanism in a shop on a support or truck which is movable towards and from a wall or other receptacle to which the cord is connected, whereby the cord may be, upon movement of the support or truck towards or away from said receptacle, drawn off or wound on the reel, dependent upon the location of the working positions of the tools driven by the current supplied through the conductors of the cord. In this application, the moving support or truck may carry a number of motors fed by current through the conductors of the cord, and which motors may be arranged on the truck or at other suitable locations to receive current from the source of current.

Other applications of the invention may be to cranes, to mining machinery, stone quarry machinery, and other places, and the reel and distributing structure may be movable towards and from a fixed receptacle for connection to the cord, or the receptacle may be movable while the reel and distributng support may be fixed.

One of the objects of the invention is to produce a simple and efficient cord reel winding and conductor and current distributing structure which is compact, is constructed to be easily maintained, and in which the parts are readily accessible for inspection and repair.

A further object of the invention is to produce a combination of this character in which the conductor and current distributing mechanism may be expanded or contracted to handle cords containing varying numbers of conductors, and to electrically connect said conductors, through current distributing means and proper brush connections to electrical machines.

Another object of the invention, subordinate to the object just mentioned, is to arrange the elements of the cord winding and conductor distributing mechanism side by side in such a way that the parts can be supported for rotation about a common axis, thus conducing to the compactness and convenience of the structure.

Another object of the invention, in respect of sidewise disposal of reel and conductor distributing mechanism, is to produce a disconnectible drive connection between the reel structure and the conductor distributing structure.

A further object of the invention is to provide novel means for roving or unroving the cord on the reel when the cord is to be wound on or to be unwound from the reel, and to connect the reel rotating means with the roving and unroving means so that they will operate in timed relation.

Other objects of the invention are to further simplify and improve cord reel and conductor distributing structures, and the invention consists in the elements and the combination of elements shown in the drawings and described in the specification and their equivalents, and is pointed out in the appended claims.

In the drawings showing one embodiment of the invention:

Figure 1 is a side elevation of the machine.

Figure 2 is a section on the line 2—2 of Figure 3.

Figure 3 is a section in the plane of the axis of rotation of the reel.

Figure 4 is a section on the line 4—4 of Figure 3, with parts broken away.

Figure 5 is a sectional detail illustrating the cable outlet and a part of the cable roving mechanism.

Figure 6 is a plan view of said outlet.

Figure 7 is an axial section of a plural set of rewinding springs.

Figure 8 is an end view of the conductor and current distributing portion of the machine, partly broken away.

Figure 9 is a section on the line 9—9 of Figure 3.

Figure 10 is an axial section of the conductor distributing and current distributing mechanism.

Figure 11 is a detail of one of the distributing rings taken on the line 11—11 of Figure 12.

Figure 12 is a face view of one of said rings.

Figure 13 is a partial face view of a disk to divide adjacent distributing rings.

Figure 14 is a section on the line 14—14 of Figure 9.

Figure 15 illustrates a polarity pin and its connecting sleeve.

Figure 16 is a plan view of the upper part of the base to receive the plugs connected to the brushes that operate with the distributing rings.

Figure 17 is a bottom plan of the lower part of the conductor receptacle.

Figures 18, 19 and 20 are sections on the respective lines 18—18, 20—20 and 19—19 of Figure 16.

The frame of the machine may follow the selection of the designer. It comprises, as herein shown, end standards 25, 26, which may be of the shape shown in Figure 1, and a fixed shaft 27 which extends transversely between and is supported on said standards in the manner shown in Figures 1 and 10, locked to the standards by the screws 27'.

Supported on said frame is a reel including a spool 28 and end flanges 29, on which the cord C is wound and from which it is unwound. The reel is hollow to receive the serially connected rewinding convolute springs 30, 31, shown in Figure 3. Two such springs are shown in Figure 3, with the inner turn of one spring made fast to the shaft and the outer or last turn of the spring made fast to the spool, all springs being fast at their inner ends to hubs one loose and the other fast on the non-rotative shaft 27. Ball bearings 33 may be employed between the rotative reel structure and the fixed shaft. In Figure 7 is shown a rewinding spring set composed of a larger number of springs 30, 31, but serially connected between the shaft and spool in the same general way as before mentioned, to adapt the construction to a longer cord or a cord of greater diameter.

A brake device consisting of radial, spring outheld dogs 32 bearing at their outer ends against the inner eccentric face 33' of the hub associated with the rewinding spring 30, and having an internal stop shoulder for engagement with said dogs, may be employed to slow down, within proper control, the rotation of the drum under the action of their springs, in the event of the breakage of the cord. It will be seen that in case the cord breaks, there is no longer any pull on that end of the spring that is connected to the stationary shaft, and therefore the spring tends to unwind from both ends. A turning effort is therefore applied to the hub in a direction to carry the shoulder away from the dogs 32, the dogs being pressed inwardly by the inclined or eccentric face in the hub and increasing the pressure of the springs behind them. Therefore the dogs act as friction shoes to retard the turning movement of the hub.

The cord C is adapted for connection to a receptacle at a source of current supply (not shown), and it is between this receptacle and the conductors C' of the cord C that said cord is wound about and unwound from the reel, the inner turn of the cord being fastened to the spool structure by the clamp 34, as shown in Figure 3 and Figure 4.

So far as the rewinding is concerned, it is only necessary to say that, whatever number of springs be used, one terminal spring is connected at its inner turn to a fixed abutment, as the shaft 27, while the other terminal spring is connected at its outer turn to the reel drum or spool 28, the intermediate springs being connected by the cups or flanged plates 29', and to the shaft so as to operate in series, whereby the range of said springs can be made very long while occupying a very compact radial compass.

In the use of cords of the size herein indicated, it is desirable to employ a roving device whereby, when the cord is wound on the drum, the cord turns will be readily laid side by side and prevent bunching; and the roving device also assists in drawing out the cord. The cord outlet and the roving device or carriage herein shown are made as follows:

35 designates a hood which is fixed on the casing 36 that encloses the reel structure. The roving carriage, hereinafter to be described, is contained in the hood just inside the outlet thereof. 37 designates a guide ring that is suitably mounted on plates 38 that are parallel to each other and are pivoted to the hood side walls by a shaft 39, said guide ring being disposed at the outlet of the hood. It is equipped with freely rotating balls 40, 40 to avoid abrasion of the cord, and the pivotal mounting of said plates 38 gives ample freedom of movement to permit of free withdrawal of the cable in all desirable directions. The roving device comprises, in addition to said plates 38, guide spools 41 mounted on supports 42, which extend between and are mounted in the plates 38 (Figures 3 and 5). The roving device or carriage thus made up, including the cable outlet ring 37, is mechanically movable laterally across the outlet opening of the hood a distance to rove the cable on the reel spool.

Said roving carriage is thus moved in timed relation to the rotational movement of the reel by the following mechanism:

The shaft 39 for the roving frame plates 38 is rotated from a sprocket gear 50 on the hub 51 of the reel, as by a sprocket chain 52, which is also trained about a sprocket wheel 53 on said shaft 39; said shaft being supported in anti-friction bearings in the walls of the hood. The roving carriage embraces in its construction a two-part housing, consisting of the elements 55 (Figure 3). In said housing and confined in registering recesses on adjacent faces of the two blocks or parts 55 is seated to rotate freely the shank of a stud 56 that is provided at its inner end with fork arms 57 which are engageable with intersecting right and left screw threads on the shaft 39, as shown best in Figure 3. The pitch of said crossing right and left hand threads, and their proportions with respect to the length of the reel are such that when said roving carriage travels from one end to the other of its path of movement by engagement of the driving stud fork arms 57 with said threads, the threads will, by reason of their angular arrangement to said arms, afford a driving connection that will carry the carriage a predetermined lateral or sidewise movement, and will automatically arrest and reverse the direction of movement of the carriage at each end of its travel while maintaining unidirectional movement of said shaft 39. Therefore, the roving carriage is automatically reversed at each limit of its travel; and the pitch of the threads of the shaft 39 will, in a given installation, be so related to the length of the spool, that the travel of the roving carriage from one end to the other of its movement will lay a full course of cable turns along the reel spool.

Referring now to the conductor and current distributing mechanism,—the manner of connecting the conductors to the current distributing elements and for carrying the current from each conductor to an outside electrical machine for connection to such machine which is to be operated by current, these details are best shown in Figures 3 and 10 to 20, both inclusive, and are made as follows:

60, 61 designate a supporting plate and a ring; respectively, between which are assembled a group of current collecting or distributing rings or elements. Said rings are concentric to a tubular shaft 62 that is mounted on the adjacent end of the fixed reel supporting shaft 27 before referred to. The distributing or collecting rings and their appurtenances are confined on said tube between a fixed washer 63 and a threaded clamp washer 64 (Figure 10). The sleeve 62 is rotatively mounted on said fixed shaft, and driving connection is established between said sleeve 62 and the reel structure by a crank pin 66 fixed eccentrically on the washer 63 and entering an opening in the adjacent hub of the rotative reel. Endwise movement of the sleeve, when not otherwise confined, releases driving connection to said sleeve 62 and the parts carried thereby.

Mounted on said shaft are a series of metallic distributor or collector rings, each designated as a whole by 70 (Figures 10 and 11). Said rings may be collector or ditributor rings, depending upon the particular electrical equipment being used and the manner of completing the working circuits. They are flared at their peripheries to produce between their peripheral portions V-shaped grooves 71.

Said rings are formed partly by a body 72 of suitable insulating material, as bakelite, and partly by the metallic peripherally beveled portions. The metallic parts are further insulated from each other by disks 73 of like insulating material. For this purpose, each disk extends to the sleeve 62 and radially outwardly a distance beyond the metallic parts of said distributor or collector ring parts to avoid arcing. The metallic portions of said rings can be fastened together by the rivets engaging the radial portions or lugs 80, as shown in Figure 11. The lugs 80 are formed with aligned threaded openings to receive the binding screws 78 to fasten to said lugs conductor terminals 81 which establish circuit connection between the conductors and rings.

In order that conductor terminals 81 may be properly insulated from each other, they are connected to the lugs 80 of the general distributor structure at spaced angular distances, so as to provide air insulation between said connectors, in addition to the molded insulation described, and to prevent current striking across between terminals or connectors of different polarity. In the construction shown, there is employed four of such lugs 80 and three openings 83 in the sidewise disposed rings. The parts are so assembled on the sleeve 62 that the openings 83 of the rings are severally in line with each other and the disks 73 are also apertured to fit over the sleeve and are formed with like angularly spaced openings 88 that align with the openings 83.

Therefore, when the disks and the metallic rings are set up in the manner shown in Figure 10, there will be formed through, what may be termed the compound core, three angularly spaced channels. The full length of one of these channels is clearly shown in Figure 10 and will, as a whole, be indicated by 89. It is also indicated in this figure how the conductors C' are brought out from the cord C, and how they can, by the conducting terminals 81, be attached to the rings in a, so to speak, spiral fashion, about the axis of the sleeve 62. Thus it becomes possible in a very compact structure to handle high pressure lines without danger of short circuiting.

Current is taken from the rotary rings by means of brushes 90, best shown in Figure 9, and indicated in Figure 3. They have wedge-shaped faces to engage the V grooves of the rings. Each brush (substantially a duplicate of the others) is supported on a mounting comprising a clasp 91, a hinged pivot bracket 92, and a connecting insulating piece 93. The pivot brackets are loosely supported on a long pivot shaft 95 extending between the plates 60 and ring 61. Springs 96 are employed to hold the brushes properly in the grooved rings. Spring pressure may be varied by means of a pin 98 fixed radially to the outer end of the shaft 95 (Figure 3) and adapted to engage with a pin 100 which may be seated in either of the angularly spaced openings in the adjacent plate 60.

Said brushes so insulated from the frame by the insulating members 93 of their mountings are connected through conductors 105 and terminal connectors 106 to polarity pin 107 located in a superposed receptacle 110. Said polarity pins are fixedly seated in the base members 109 of receptacle 110, that are, in turn, seated and fastened in place, in any suitable manner, in an upturned rim of a casing 112 which surrounds the entire current and conductor distributing mechanism; said casing being held between the end plate and ring 60, 61, respectively, by means of the clamping bolts 60'.

The polarity pins 107 are reduced at their lower ends and are threaded into nuts 108 embedded in the molded bottom 109 of the receptacle. Mounted on the receptacle bottom is the receptacle top or cover constituting, in this instance, two insulating members 115, 116. The receptacle is enclosed within a sheet metal casing 117 which rises from and is connected at its lower end to the floor member of the receptacle. The two elements 115, 116 constituting the top or cover of the receptacle, are held together by bolts 120 (Figure 9), and these bolts are threaded into brackets 121 which are in turn fastened to the top 125 of the casing 117. It will, therefore, be observed that removal of the casing top 125 will carry with it the two part top of the conductor outlet receptacle.

The removable top of the receptacles carries metal conducting sleeves 127 which are severally adapted to line with and to be slipped over the polarity pins 107, said plugs being split and rounded for easy entrance into said sleeve. The said sleeves 127 are shown as fastened between the meeting faces of the two-part receptacle cover by flanges 130 which are pressed therebetween by the bolts 120, so that when the two-part receptacle cover is removed the sleeves are carried away with it, and thereby dis-establish electrical contact between the polarity pins and said sleeves. The said polarity pins and their sleeves, together with the brushes and disks, establish metallic contact connection between the conductors C' and external conductors C² that are electrically connected to the upper solid ends of the sleeves 127, said conductors leading outwardly to the places of application of the current carried thereby.

The assemblage of the structure is such that it may be readily adjusted to cords of different lengths and diameters by simple substitution of parts in a frame structure that can be standard for all adjustments. The conductor and current distributing elements of the machine are also capable of adjustment to greater or less numbers of conductors. For instance, the frame members 25, 26, 60, 61, the end enclosures for the reel, will remain standard parts, and by spreading the frame lengthwise, space is made for a greater or less number of collector or distributor rings between the plate 60 and ring 61. Likewise, a reel drum of greater length may be assembled in the machine. The foregoing relates to the original machine or the enlargement or reduction of a given machine in the field.

The conducting rings and their insulating bodies constitute units which are mounted on and placed along the sleeve 62 with the units spaced by the insulating disks 73, each unit and disc being separately removable from and replaceable on said sleeve permits the assemblage to be made with as large or small a number of units as is desired within limits, it being only necessary to substitute different length sleeves and tie bolts in the combination, including the permanent plate and ring 60, 61, respectively. The uniformly spaced openings in the units produce, when the units are assembled on a common support, uniformly spaced conduits or channels to receive the conductors with each ring of a unit having a radial conducting member extending into a conduit for connection to a conductor.

I claim:

1. In combination, a sleeve, a series of endwise disposed separate units thereon comprising peripheral conducting rings and insulating bodies, and formed with angularly spaced openings so disposed that when the units are endwise matched they produce conduits spaced angularly about the axis of said sleeve, said rings having conducting connections which extend radially into said conduits for connection to conductors laced through said conduits.

2. In a cord and current distributor, a unit comprising a metal disc having a central opening and a peripheral brush face, and a body of insulating material applied over the central portion of said disc, said disc and said body being provided with a plurality of openings disposed angularly about said central opening.

3. In a cord and current distributor, a unit comprising a metal disc having a central opening and a peripheral brush face, and a body of insulating material applied over the central portion of said disc, said disc and said body being provided with a plurality of openings disposed angularly about said central opening, said peripheral brush face being of trough form, with the walls of each face formed by separately formed metal elements.

In witness whereof I claim the foregoing as my invention, I hereunto append my signature this 14 day of October, 1924.

ERNST G. K. ANDERSON.